No. 607,698. Patented July 19, 1898.
J. McCALLUM.
COMBINED MOWING AND RAKING MACHINE.
(Application filed Jan. 26, 1897.)
(No Model.)
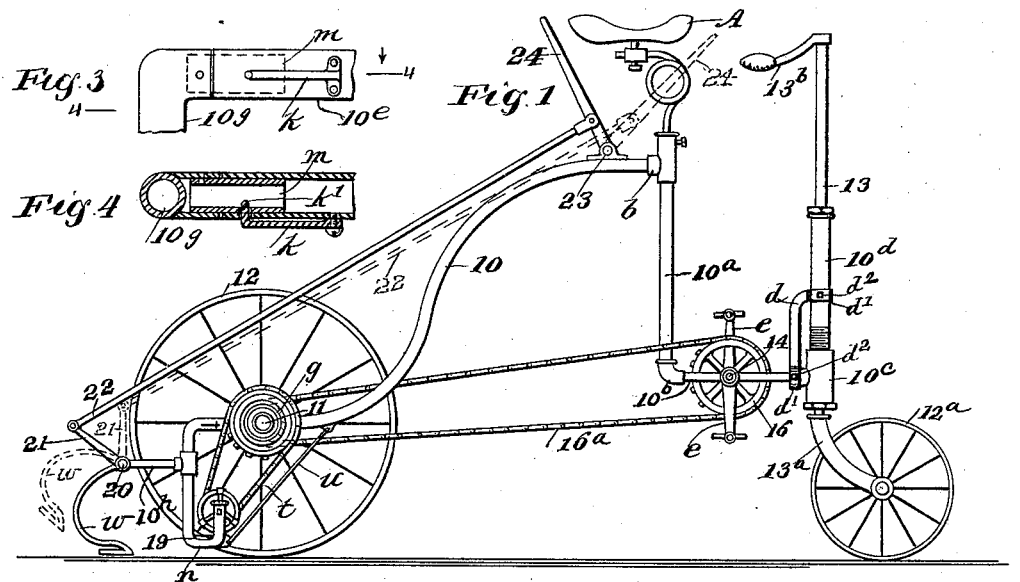
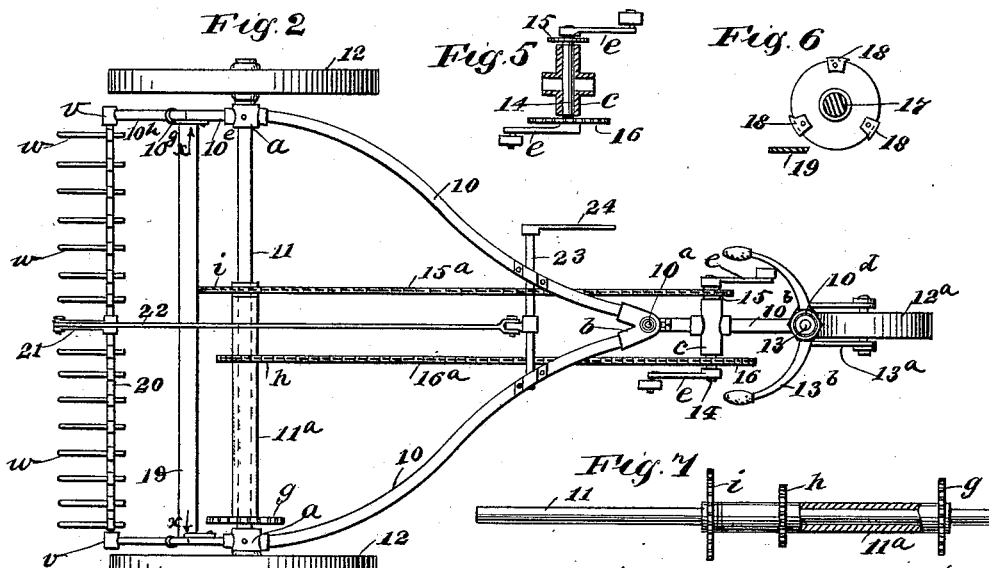
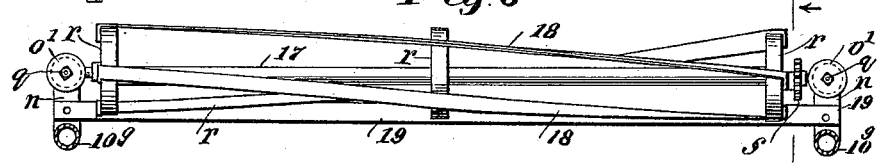
WITNESSES:
INVENTOR
J. McCallum
BY
ATTORNEYS.

UNITED STATES PATENT OFFICE.

JOHN McCALLUM, OF CHIPPEWA FALLS, WISCONSIN.

COMBINED MOWING AND RAKING MACHINE.

SPECIFICATION forming part of Letters Patent No. 607,698, dated July 19, 1898.

Application filed January 26, 1897. Serial No. 620,784. (No model.)

*To all whom it may concern:*

Be it known that I, JOHN McCALLUM, of Chippewa Falls, in the county of Chippewa and State of Wisconsin, have invented a new and Improved Combined Mowing and Raking Machine, of which the following is a full, clear, and exact description.

This invention relates to a class of grass-mowing machines more particularly used for cutting grass on lawns, and has for its object to provide a lawn-mower which will be adapted for carrying the operator, who by pedal movement propels the machine and also rotates the grass-cutting device, a further object being to combine with the lawn-mower a raking device which is under control of the person riding on and propelling the mowing device and also to provide inexpensive and convenient means for separating different members of the frame of the mowing-machine to permit the machine to be closely packed for transportation.

The invention consists in the novel construction and combination of parts, as is hereinafter described, and pointed out in the claims.

Reference is to be had to the accompanying drawings, forming a part of this specification, in which similar characters of reference indicate corresponding parts in all the figures.

Figure 1 is a side elevation of the improved lawn-mower having a rear wheel removed and raking attachment thereon. Fig. 2 is a plan view of the mowing and raking devices combined, the rotary cutter-head of the mowing device being removed. Fig. 3 is an enlarged side view of part of the frame for the improved combined implement, showing means for detachably connecting two portions of said frame, seen opposite the arrows $x$ in Fig. 2. Fig. 4 is a longitudinal sectional view of the details shown in Fig. 3, taken substantially on the line 4 4 in said figure. Fig. 5 is a detached plan view of the pedal-shaft for the mowing-machine, crank-arms and pedals thereon at the ends of the shaft, two driving sprocket-gears of different diameters secured on said shaft near the crank-arms, and a shaft-box in section. Fig. 6 is an enlarged transverse sectional view of the rotary cutter-shaft and the flat cutter-bar, showing ends of the spaced knives secured on the circular knife-support at one end of the rotary cutter. Fig. 7 is a detached plan view of the main axle of the lawn-mower, a rotatable sleeve thereon, two sprocket-gears of different diameters secured on the sleeve, and a sprocket-gear affixed upon the axle. Fig. 8 is an enlarged plan view of the rotary cutter, a flat cutter-bar, and frame-supports for said cutting devices at their ends; and Fig. 9 is an enlarged partly-sectional side view of the frame-support for the rotary cutter and a flat cutter-bar at one end of said parts, seen in direction of arrow $y$ in Fig. 8.

The improved grass-cutting device, in brief, consists of a tricycle, a rotary cutter at the rear of the tricycle adapted for rapid rotation by pedal propulsion, effected by the rider of the tricycle, that is also progressively moved by like means.

In the drawings representing the improvements the preferably tubular frame of the machine consists of the two similarly-bent backbone members 10, that are provided with axially-alined boxes $a$ near their rear and lower ends. In the boxes $a$ is loosely supported the main axle 11, having the similar traction-wheels 12 affixed upon its ends outside of the boxes $a$.

The frame members 10 curve upwardly and forwardly and converge, so as to join a connecting-sleeve $b$, the upright portion of which is joined to an upright saddle-post $10^a$, that at the lower end extends forwardly and horizontally, producing the frame member $10^b$, wherein is formed or secured the transverse pedal-shaft box $c$. The forward end of the frame member $10^b$ is affixed to an upright internally-threaded tubular box $10^c$, having a tubular extension $10^d$, externally threaded to screw into the upper end of the said tubular box. In the box $10^c$ and extension $10^d$ a steering-shaft 13 is rotatably inserted, having the usual curved handle-bar $13^b$ secured on its upper end. The lower portion of the shaft 13 terminates in a fork $13^a$, which receives the front wheel $12^a$, that is pivoted between the limbs of the fork.

Preferably a brace $d$ in the form of a bent arm having integral rings $d'$ on its ends is provided to join the frame member $10^b$ with the extension-piece $10^d$. The ring ends $d'$, that respectively encircle the frame members and extension-piece named, are thereto detachably secured by the set screw-bolts $d^2$, as indicated in Fig. 1, and serve to stiffen the latter against lateral movement, said brace being shown in Fig. 1. On the post $10^a$ a spring-supported saddle A is mounted and adjustably secured, as indicated in Fig. 1. On the pedal-shaft 14 are the usual crank-arms $e$, having pedals on their free ends, said arms trending in opposite directions in the ordinary manner.

Two sprocket-gears 15 16, of different diameters, are secured on the pedal-shaft 14 between the crank-arms $e$ and the ends of the shaft-box $c$, wherein the pedal-shaft is loosely supported.

An elongated sleeve $11^a$ is loosely mounted on the main axle 11, and on said sleeve two sprocket-gears $g$ $h$ are placed and secured. The gear-wheel $g$, that is preferably located near the axle-box $a$ at the right side of the machine, is of considerably-greater diameter than the sprocket-gear $h$. On the axle 11, near the inner end of the sleeve $11^a$, a sprocket-gear $i$ is affixed, which is alined with the smaller sprocket-gear 15, that is on the pedal-shaft 14, near the left-hand end of the same, and a sprocket-chain $15^a$ connects the gears $i$ and 15. The smaller gear $h$ on the sleeve $11^a$ is alined with the larger sprocket-gear 16 on the pedal-shaft 14, and these gears are connected by a sprocket-chain $16^a$.

It will be seen that by the relative proportion and disposition of the sprocket-gears on the pedal-shaft 14, sleeve $11^a$, and main axle 11 the rotation of the pedal-shaft in a forward direction will transmit rotary motion in a like direction to the main axle 11 and sleeve $11^a$, the rate of motion given to the axle being slower than that of the pedal-shaft and the speed of rotation for the sleeve increased as compared with that of the pedal-shaft.

From the axle-boxes $a$ two like frame-limbs $10^e$ are projected horizontally and rearwardly, of equal length. Upon the rear ends of the limbs $10^e$ the similar depending frame members $10^g$ are detachably secured. The frame portions $10^e$ and $10^g$ for the sake of lightness and convenience in manufacture are preferably made tubular, and in case they are formed of pipe, as shown in Figs. 1, 3, 4, and 9, the meeting ends of said portions may be advantageously connected as represented in Figs. 3 and 4, said connections consisting of a nipple $m$, secured in and projecting from the upper horizontal end of each bent piece $10^g$, which nipple neatly fits within the open end portion of the complementary hollow frame-limb $10^e$, so as to connect the parts $10^e$ $10^g$.

The inserted nipples $m$ may be held in the tubular limbs $10^e$ by the like spring-latches $k$, that have one end of each latch-piece affixed to a tubular limb $10^e$ and a toe $k'$ on its free end entered within registering perforations in the wall of said limb and the nipple $m$ within the same, so that when thus engaged the spring-latches on the limbs $10^e$ at each side of the machine-frame will be adapted to hold the frame members $10^g$ in connection therewith and permit a convenient detachment of the latter as occasion may require. The frame members $10^g$ each consists of a tubular piece bent at the upper end at a right angle to provide a short end for the reception of the nipple $m$, which is secured therein, as before explained. From said bend the frame members in the form of legs having equal length depend to a point near the ground-level, as shown in Fig. 1. At the lower end of each frame member $10^g$ it is bent forwardly, and thus provides a short horizontal portion $n$, these being of equal length on said frame members. The forward ends of the horizontal frame portions $n$ are bent upwardly, providing short hollow posts $o$ thereon, which posts are in the same transverse plane that is parallel with the vertical plane of the depending legs on the frame members $10^g$.

Each post $o$ is transversely slotted from its upper end downwardly, and like slidable boxes $p$ are fitted therein, one box being held adjustably in each post by an adjusting-screw $q$, that screws through the cap $o'$, which is secured upon the upper end of the post, as indicated in Fig. 9. In the boxes $p$ journal ends of the cutter-head shaft 17 are loosely inserted, and on said shaft the knife-supporting blocks $r$ are secured, one at each end and one near the longitudinal center of the shaft, as shown in Fig. 8. The cutter-knives 18 are twisted a proper degree, as is usual in the formation of such rotary cutting-blades, to adapt them to cut with a shearing action when they are secured upon the blocks $r$ at proper distances apart.

On the short frame portions $n$ of the frame members $10^g$ a cutter-bar 19 is secured by its ends, said flat metal bar having its front edge beveled to sharpen it, as shown in Fig. 9. On the cutter-shaft 17 a small sprocket-gear $s$ is mounted and fixed near the right-hand end in such a relative position as will aline it with the larger sprocket-gear $g$ on the right-hand end of the sleeve $11^a$, and a sprocket-chain $t$ is placed upon the gears $s$ and $g$ to connect them.

Two diagonal braces, one at each upright post $o$, extend from said posts to be secured by their upper ends to the frame portions 10, as shown for one side of the machine at $u$ in Fig. 1, said braces serving to stiffen the depending frame portions $10^g$ and render said portions of the frame more substantial.

It should be explained that it is very essential for the proper disposition of the cutting mechanism at the rear of the axle 11 that the frame members $10^e$ be rearwardly extended from the axle-boxes $a$, as shown and described, and also to provide means for a quick attachment of the supports of the cutting device on said members 10ᵉ, as it will be seen that this construction affords the necessary room to permit the chain t to work freely and enables a convenient detachment of the entire cutting device when the cutter-knives are to be detached for sharpening or other repairs.

From the frame members 10ᵍ two similar arms 10ʰ project rearwardly in the same horizontal plane, and on the outer ends of these arms laterally perforated and alined boxes v are formed or secured, wherein the ends of the transverse rake-head bar 20 are respectively journaled. In the rake-head bar 20 a series of spaced teeth w are secured by their upper ends, and said teeth are in a like degree rearwardly and downwardly curved, thereby disposing their lower ends forwardly. The lower end portion of each rake-tooth w is preferably bent so as to fold it rearwardly, thus affording a shoe-piece w', which contacts with the sward when the rake is in use.

An arm 21 projects from the rake-head bar 20, as shown in Figs. 1 and 2, and at the outer end of said arm one end of the connecting-rod 22 is pivoted.

Upon the frame-pieces 10, near their forward ends, a rock-shaft 23 is journaled, which shaft is furnished with a lever 24 on one end. The upper end of the connecting-rod 22 is pivoted upon the lever 24, which adapts the latter, if vibrated, to raise or lower the rake-teeth m by a rocking movement of the rake-head bar 20, as is shown by full and dotted lines in Fig. 1.

It will be seen that the lever 24 is conveniently positioned at one side of the saddle A, so that the operator of the tricycle mowing and raking machine may with ease manipulate the rake by means of the lever mentioned while riding on the saddle.

The improved tricycle mowing-machine is adapted for use on large lawns and in fields where grass is grown, and it is apparent that growing grass may be rapidly cut and raked into rows by use of the improved grass cutting and raking device.

It will be seen that the peculiar construction of the front frame-post and the detachable bent bracing-arm d, which affords support to said post, enables the easy detachment of these parts of the main frame, and as other principal frame members are readily separated from each other it will be evident that the complete machine is adapted for such a dismemberment of parts as will allow it to be very closely packed in a box or otherwise for transportation when shipped from the factory to dealers in such implements.

Many slight changes in minor details of construction may be made in the improved mowing and raking devices within the scope of my invention. Hence I do not desire to restrict the construction of such details to the precise shapes shown.

Having thus described my invention, I claim as new and desire to secure by Letters Patent—

1. In a machine of the described construction, the combination with a rotatable steering-wheel, and the forked steering-rod, of the upright internally-threaded sleeve-box, the tubular box extension having a threaded engagement with the internal thread of the sleeve-box, said box extension loosely supporting the steering-rod, the bent bracing-arm having integral rings at its ends that encircle the box extension and also a horizontal lower portion of the bicycle-frame, and are thereto detachably secured by set-bolts so as to stiffen the box extension, and a handle-bar on the upper end of the steering-rod, substantially as described.

2. In a machine of the described construction, the combination of the main frame having two spaced depending frame portions at the rear of the transverse axle, two forwardly and upwardly bent integral hollow members on lower ends of the said depending frame portions, and securable cap-pieces on the upwardly-bent parts of the hollow frame members, two laterally-bored boxes in the upright hollow members, a rotatable cutter-head, journal ends of which pass through vertical slots in the said hollow frame members to an engagement with the boxes therein, set screw-bolts screwing down through the cap-pieces and loosely engaging the boxes to elevate or depress them, and a fixed cutter-bar on horizontal portions of the integral hollow frame members, substantially as described.

3. In a machine of the described construction, the tubular frame having two limbs rearwardly projected from two axle-boxes, that are on said frame, two similar rearwardly-projected and depending frame portions on said frame-limbs, the upper horizontal parts of said frame portions being separable and provided with spring latching connections to adapt the depending portions of the frame for convenient detachment from horizontal parts thereof, substantially as described.

4. The combination with a tricycle-frame, a rear main transverse axle thereon, two traction-wheels on ends of said axle, a swiveling front wheel controllable by a handle-bar, and a seat on the tricycle-frame, near the handle-bar, of a pedal-shaft, having crank-arms and pedals thereon, two sprocket-gears of different diameters fixed on the pedal-shaft, a sleeve on the axle, two sprocket-gears on the sleeve, one of said gears connected by a sprocket-chain with one sprocket-gear on the pedal-shaft, a sprocket-gear on the axle, chain-connected with the other gear on the pedal-shaft, and a rotatable transverse cutter, having a sprocket-gear on its shaft, which is chain-connected with the remaining sprocket-gear on the sleeve, substantially as described.

5. In a machine of the described construction, the depending rear portions of the tricycle-frame having upright posts spaced from the depending legs of the frame by short horizontal members, said members being adapted to support ends of the flat cutter-bar of the machine, and the upright posts provided with vertically-adjustable boxes which carry journal ends of the shaft on the rotary cutter device which coacts with the cutter-bar, substantially as described.

JOHN McCALLUM.

Witnesses:
FREDERICK T. CONDIT,
PETER C. BERGEROS.